(12) United States Patent
Hilliar Isaacson

(10) Patent No.: US 8,054,196 B2
(45) Date of Patent: Nov. 8, 2011

(54) METHOD OF PERFORMING NOTIFICATION IN PERSONAL NAVIGATION DEVICE

(75) Inventor: Thomas Edward Hilliar Isaacson, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 411 days.

(21) Appl. No.: 12/336,542

(22) Filed: Dec. 17, 2008

(65) Prior Publication Data
US 2010/0148981 A1    Jun. 17, 2010

(51) Int. Cl.
*G08B 21/00* (2006.01)
(52) U.S. Cl. ............... 340/686.6; 340/435; 340/905; 701/35; 701/213; 701/93
(58) Field of Classification Search .............. 340/439, 340/905; 701/35, 213, 93
See application file for complete search history.

(56) References Cited

U.S. PATENT DOCUMENTS

| | | | |
|---|---|---|---|
| 6,556,905 B1 * | 4/2003 | Mittelsteadt et al. | 701/35 |
| 2005/0171663 A1 * | 8/2005 | Mittelsteadt et al. | 701/35 |
| 2008/0036612 A1 * | 2/2008 | Koslow et al. | 340/573.4 |

* cited by examiner

*Primary Examiner* — Daryl Pope
(74) *Attorney, Agent, or Firm* — Winston Hsu; Scott Margo

(57) ABSTRACT

To help a user avoid potentially harmful purchases, performing notification in a personal navigation device (PND) includes determining position of the PND, comparing the position against a plurality of restricted points of interest according to a predetermined setting, and activating an alert when the position is within a threshold distance of one of the restricted points of interest.

24 Claims, 3 Drawing Sheets

METHOD OF PERFORMING NOTIFICATION IN PERSONAL NAVIGATION DEVICE

BACKGROUND OF THE INVENTION

1. Field of the Invention

The present invention relates to personal navigation devices (PNDs), and more particularly, to a method of notifying a user of a PND about restricted areas, promotions, and other points of interest.

2. Description of the Prior Art

A number of navigation methods have been employed over the centuries by sailors desiring to go from one place to another without getting lost on the way or passing through dangerous waters. Whereas in the past, navigation was typically of interest to navigators on marine vessels, as more advanced navigation systems are developed, drivers, hikers, and tourists are rapidly adopting Global Navigation Satellite System (GNSS) receivers as aids in their travels.

One key to navigation is positioning, or the art of knowing precisely where one is at any given moment. In the past, positioning was accomplished through use of a sextant, which measures angular positions of celestial bodies relative to the horizon. Today, positioning can be accomplished with fair accuracy by GNSS receivers. Currently, only the NAVSTAR Global Positioning System (GPS) developed by the United States Department of Defense offers comprehensive positioning satellite coverage around the globe, though other systems should become operational by the year 2010.

A typical personal navigation device (PND) will include an antenna for receiving electrical signals transmitted by GPS satellites, and positioning circuitry for determining a position of the PND from the electrical signals, and generating corresponding position data. The antenna can be integrated into the PND, or can be connected externally through a wire. The PND may also provide functions that use the position data generated. Typically, the PND can be a standalone mobile device, or can be integrated into an automobile as another instrument on the dashboard. The standalone mobile device can also be adapted for use in an automobile through a mount, which can be attached to the automobile through suction cups or other more permanent means.

The PND will typically include an internal map, which can be used in conjunction with the position data to determine where the PND is located on the map. Based on this information, a navigator function of the PND can calculate a route along known roads from the position of the PND to another known location. As mapping software becomes more detailed, with greater numbers of references to points of interest (POIs), many new functionalities are yet to be explored. Particularly, as POIs are classified, greater integration between the position data and POI data should be developed.

SUMMARY OF THE INVENTION

According to an exemplary embodiment of the present invention, a method of performing notification in a personal navigation device (PND) comprises determining a position of the PND, comparing the position against a plurality of restricted points of interest according to a predetermined setting, and activating an alert when the position is within a first threshold distance of one of the restricted points of interest.

According to a second embodiment of the present invention, a method of performing notification in a PND comprises determining a position of the PND, filtering a plurality of data according to the position of the PND and a predetermined rule to form a notification, and displaying the notification in the PND.

According to a third embodiment of the present invention, a method of performing notification in a PND comprises determining a route of the PND, filtering a plurality of data according to the route of the PND and a predetermined rule to form a notification, and displaying the notification in the PND.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
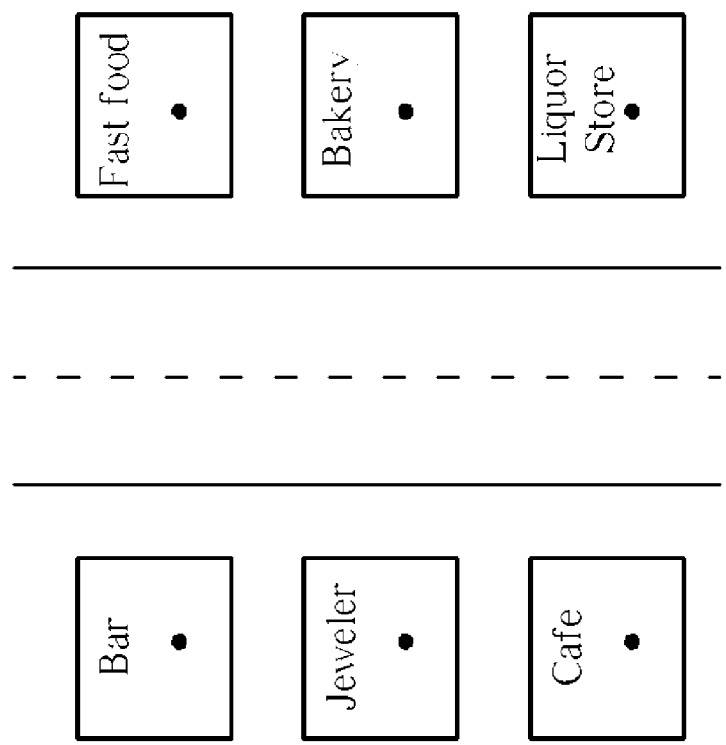
FIG. 1 is a diagram of points of interest in a personal navigation device (PND).

Please refer to FIG. 1, which is a diagram of points of interest in a personal navigation device (PND). The PND may frequently determine its current position based on positioning signals received from positioning satellites, such as GPS satellites. As shown in FIG. 1, a number of different points of interest may be present along a given street, e.g. a bakery, a bar, a jewelry store, a fast food restaurant, etc., near the current position of the PND. In practice, each point of interest may have a name, such as Noah's Bagels, McDonalds, TGIF, and The Shane Company, whereas the words "Bakery," "Fast Food," and "jeweler," etc., may indicate classification of each point of interest. Each store may belong to more than one classification, as well. For example, a store such as Costco may be classified under "Grocery," "Tires," "Hardware," and "Electronics."

Figure 2:
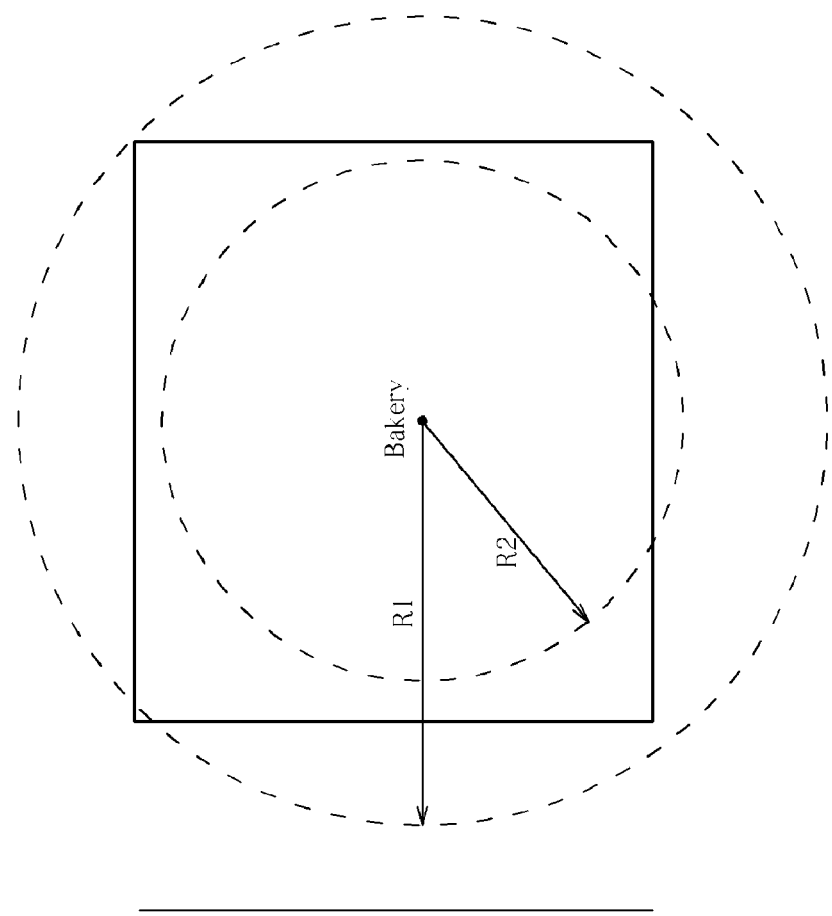
FIG. 2 is a diagram of activating a warning in the PND based on distance from a point of interest.

In some cases, a user of the PND may be interested in particular goods offered by a retailer, such as those mentioned above, or the user may wish to avoid certain retailers, particularly if the user were on a diet, for example, in which case the user may wish to avoid fast food restaurants and bakeries. Please refer to FIG. 2, which is a diagram of an embodiment of the present invention method pertaining to the latter case. FIG. 2 illustrates two levels of warnings that may be activated in the PND based on how closely the user approaches a point of interest, in this case, a bakery. As shown, if the user comes within a first distance R1 of the bakery, an alert may be activated in the PND. The alert could be a sound, a vibration, or an on-screen warning. In FIG. 2, the first distance R1 does not reach a road, but in practice, the first distance R1 could be set to any distance. For practical reasons, it may be preferable to keep the first distance long enough to be outside the bakery, but short enough to avoid activating alerts as the user drives by, e.g. somewhere on a sidewalk. Again, the first distance R1 could be a preset, or it could be customized by the user through a setting.

Continuing referring to FIG. 2, a second distance can be set to activate another type of alert, e.g. an email sent automatically to a support system. For example, if the user were involved in a diet program, the PND could be set to send an email to other members of the diet program to notify them that the user has gotten too close to a restricted point of interest, such as the bakery. Likewise, short message service (SMS) messages may also be sent to phone numbers of the members of the support system. As shown, the second distance is set to be within the bakery. However, the second distance could also be set to a shorter or longer distance, depending on design or user preference. The second distance could be a preset, or could be a user-customizable setting in the PND, or both. Preferably, the second distance may be shorter than the first distance.

The method shown in FIG. 2 could also be beneficial for other types of users, such as alcoholics. The PND could then be set to an alcoholic setting, which may set off the first alert if the user approaches the bar or liquor store too closely, and send an email notification to a support group when the user enters the bar or liquor store. The PND may store email addresses and/or phone numbers corresponding to members of the support group, such as friends, family members, a babysitter, etc. In addition, the PND may send a message, such as an SMS message, to the phone number of the member of the support group for either of the first alert, or when the user enters the restricted area, such as the bakery, bar, or liquor store. The PND can be given a predetermined setting, such as a diet setting or the alcoholic setting, and each point of interest can be tied to the predetermined setting based on its classification. For example, bakeries and fast food restaurants could be tied to the diet setting, whereas bars and liquor stores could be tied to the alcoholic setting. Cigar shops, or other nicotine-related points of interest, could be tied to the predetermined setting if the user is trying to quit smoking. Coffee shops, or other caffeine-related points of interest, could be tied to the predetermined setting for the user who may be trying to cut back on caffeine. Of course, none of the above examples are limitations.

A time period could also be incorporated in the present invention. For example, if the user is walking past the bakery, the alert may not be activated unless the user spends too long a period of time within the first distance of the bakery. The period of time may be a preset, such as 30 seconds, or may be customizable by the user. In this case, if the user were within the first distance of the bakery for at least the period of time, the alert would be activated. Then, the alert may be activated repeatedly as long as the user is within the first distance of the bakery. By only activating the alert after the period of time, the user's attention may not be needlessly drawn to the restricted point of interest, and the alert may only be activated if it the user is obviously hesitating, struggling over whether or not to break the rules.

Figure 3:
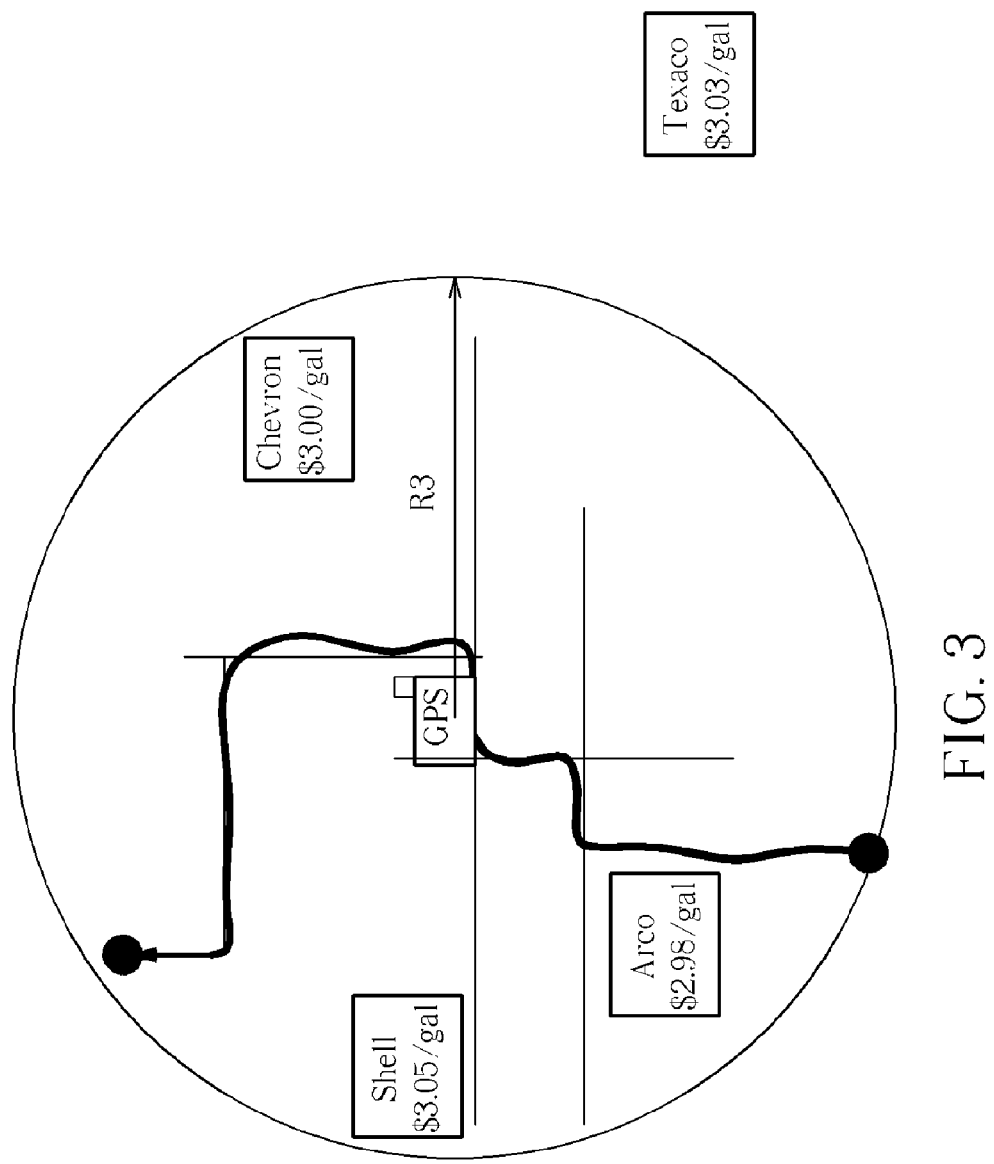
FIG. 3 is a diagram of providing notification in a PND.

The present invention can also be used in a positive manner to alert the user to nearby goods or products that are discounted. Please refer to FIG. 3, which is a diagram of using a second embodiment of the present invention to notify the user of low gas prices near the current position of the user. Once the PND has determined the position or route of the PND, it can proceed to filter a plurality of data according to the position of the PND and a predetermined rule to form a notification, and then display the notification in the PND. As shown in FIG. 3, the plurality of data can comprise a plurality of gas stations and corresponding gas prices at each of the gas stations. The predetermined rule may be a price threshold, such as a national or local average gasoline price, or a user-determined acceptable gas price. The predetermined rule could also include a threshold distance from the position of the PND. Thus, if one of the gas stations within the threshold distance of the PND is selling gas below the price threshold or below the price threshold by a certain amount, the PND may issue a notification to alert the user to cheap gas within driving distance. The threshold distance may also be measured in number of blocks or streets, as opposed to a radius such as that shown in FIG. 3. Further, the threshold distance may be defined and/or modified by the user, e.g. by entering or selecting the radius, number of blocks, or number of streets in a user interface.

In general, the plurality of data may comprise price data, product name data, event names and corresponding event times, locations, addresses, and also weather forecast data. The predetermined rule, then, may comprise a price threshold, a specific product name, a range of dates and times, a distance threshold, or a type of weather, such as dangerous weather, to name a few.

In essence, the second embodiment of the present invention allows the PND to notify the user about types of information the user is interested in based on the position of the PND. The data may be obtained through the Internet, or through other databases accessible by the PND. The notification may be displayed in the PND, and accompanied by an alert, such as flashing light, a sound or voice notification, or vibration. The user may customize the predetermined rule to receive notifications about goods, such as groceries, books, electronics, etc., and receive information about discounted goods and services in their vicinity or along their route. Or, the PND may hook in with a weather service to notify the user of dangerous road conditions along their route.

The present invention is flexible and convenient for users trying to avoid specific types of stores so as to kick bad habits, as well as for users trying to find discounted goods and services based on their current location or route. The present invention can also be used to warn users of bad weather along their route. This brings greater interaction between the user and their local community, as well as providing health-promoting benefits to the user.

Those skilled in the art will readily observe that numerous modifications and alterations of the device and method may be made while retaining the teachings of the invention.

What is claimed is:

1. A method of performing notification in a personal navigation device, hereinafter PND, the method comprising:
   determining position of the PND;
   comparing the position against a plurality of restricted points of interest according to a predetermined setting corresponding to at least one point-of-interest category; and
   activating an alert in the PND when the position is within a first threshold distance of one of the restricted points of interest.

2. The method of claim 1, wherein comparing the position against the plurality of restricted points of interest according to the predetermined setting corresponding to the at least one point-of-interest category comprises comparing the position against the plurality of restricted points of interest according to a diet setting.

3. The method of claim 1, wherein comparing the position against the plurality of restricted points of interest according to the predetermined setting corresponding to the at least one point-of-interest category comprises comparing the position against the plurality of restricted points of interest according to an alcohol setting.

4. The method of claim 1, wherein comparing the position against the plurality of restricted points of interest according to the predetermined setting corresponding to the at least one point-of-interest category comprises comparing the position against a bakery point of interest, a liquor store point of interest, a fast food point of interest, a nicotine-related point of interest, or a caffeine-related point of interest according to the predetermined setting.

5. The method of claim 1, further comprising:
sending a message to a support system when the position is within a second threshold distance of one of the restricted points of interest, the second threshold distance being shorter than the first threshold distance.

6. The method of claim 5, wherein sending the message to the support system is sending an email to an email address of a member of the support system.

7. A method of performing notification in a personal navigation device, hereinafter PND, the method comprising:
determining position of the PND;
filtering a plurality of data corresponding to at least one point-of-interest category according to the position of the PND and a predetermined rule to form a notification; and
displaying the notification in the PND.

8. The method of claim 7, wherein filtering the plurality of data corresponding to the at least one point-of-interest category according to the position of the PND and the predetermined rule to form the notification comprises filtering price data according to the position of the PND and the predetermined rule to form the notification.

9. The method of claim 8, wherein filtering the price data according to the position of the PND and the predetermined rule to form the notification comprises filtering the price data according to the position of the PND and a price threshold to form the notification.

10. The method of claim 7, wherein filtering the plurality of data corresponding to the at least one point-of-interest category according to the position of the PND and the predetermined rule to form the notification comprises filtering product name data according to the position of the PND and the predetermined rule to form the notification.

11. The method of claim 10, wherein filtering the product name data according to the position of the PND and the predetermined rule to form the notification comprises filtering the product name data according to the position of the PND and a product name to form the notification.

12. The method of claim 7, wherein filtering the plurality of data corresponding to the at least one point-of-interest category according to the position of the PND and the predetermined rule to form the notification comprises filtering event names and corresponding event times according to the position of the PND and the predetermined rule to form the notification.

13. The method of claim 12, wherein filtering the event names and corresponding event times according to the position of the PND and the predetermined rule to form the notification comprises filtering the event names and corresponding event times according to the position of the PND and a range of dates and times to form the notification.

14. The method of claim 7, wherein filtering the plurality of data corresponding to the at least one point-of-interest category according to the position of the PND comprises:
comparing location data of the plurality of data with the position of the PND; and
filtering the plurality of data corresponding to the at least one point-of-interest category when the location data is within a predetermined threshold distance of the position of the PND.

15. The method of claim 7, wherein filtering the plurality of data corresponding to the at least one point-of-interest category according to the position of the PND and the predetermined rule to form the notification comprises filtering the plurality of data corresponding to the at least one point-of-interest category according to the position of the PND and a distance threshold to form the notification.

16. The method of claim 7, wherein filtering the plurality of data corresponding to the at least one point-of-interest category according to the position of the PND and the predetermined rule to form the notification comprises filtering gas station locations and corresponding gasoline prices according to the position of the PND and the predetermined rule to form the notification.

17. The method of claim 16, wherein filtering the gas station locations and corresponding gasoline prices according to the position of the PND and the predetermined rule to form the notification comprises filtering the gas station locations and corresponding gasoline prices according to the position of the PND and lowest gasoline price to form the notification.

18. The method of claim 16, wherein filtering the gas station locations and corresponding gasoline prices according to the position of the PND and the predetermined rule to form the notification comprises filtering the gas station locations and corresponding gasoline prices according to the position of the PND and whether the gasoline prices are lower than a national average gasoline price by a predetermined threshold.

19. A method of performing notification in a personal navigation device, hereinafter PND, the method comprising:
determining a route of the PND;
filtering a plurality of data according to the route of the PND and a predetermined rule set by a user of the PND to form a notification; and
displaying the notification in the PND.

20. The method of claim 19, wherein filtering the plurality of data according to the route of the PND and the predetermined rule set by a user of the PND to form the notification comprises filtering price data according to the route of the PND and the predetermined rule to form the notification.

21. The method of claim 19, wherein filtering the plurality of data according to the route of the PND and the predetermined rule set by a user of the PND to form the notification comprises filtering weather forecast data according to the route of the PND and the predetermined rule to form the notification.

22. The method of claim 21, wherein filtering the weather forecast data according to the route of the PND and the predetermined rule set by a user of the PND to form the notification comprises filtering the weather forecast data according to the route of the PND and dangerous weather along the route.

23. The method of claim 19, wherein filtering the plurality of data according to the route of the PND and the predetermined rule set by a user of the PND to form the notification comprises filtering gas station locations and gasoline prices according to the route of the PND and the predetermined rule to form the notification.

24. The method of claim 23, wherein filtering the gas station locations and the gasoline prices according to the route of the PND and the predetermined rule set by a user of the PND to form the notification comprises filtering the gas station locations and the gasoline prices according to a predetermined threshold and a predetermined distance from the route.

* * * * *